United States Patent
Lazarev et al.

(10) Patent No.: US 12,493,615 B2
(45) Date of Patent: *Dec. 9, 2025

(54) SYSTEM AND METHOD FOR IMPROVING EFFICIENCY IN NATURAL LANGUAGE QUERY PROCESSING UTILIZING LANGUAGE MODEL

(71) Applicant: Wiz, Inc., New York, NY (US)

(72) Inventors: Daniel Lazarev, Tel Aviv (IL); Barak Sharoni, Tel Aviv (IL); Bar Magnezi, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/092,787

(22) Filed: Mar. 27, 2025

(65) Prior Publication Data

US 2025/0225128 A1    Jul. 10, 2025

Related U.S. Application Data

(63) Continuation-in-part of application No. 18/651,037, filed on Apr. 30, 2024, which is a continuation of
(Continued)

(51) Int. Cl.
*G06F 16/24* (2019.01)
*G06F 16/21* (2019.01)
(Continued)

(52) U.S. Cl.
CPC .......... *G06F 16/243* (2019.01); *G06F 16/212* (2019.01); *G06F 16/2455* (2019.01)

(58) Field of Classification Search
CPC ... G06F 16/243; G06F 16/2455; G06F 16/212
(Continued)

(56) References Cited

U.S. PATENT DOCUMENTS

| 7,657,424 B2 * | 2/2010 | Bennett ................. G06F 40/216 704/270.1 |
| 7,725,307 B2 * | 5/2010 | Bennett ............. G06F 16/24522 704/238 |

(Continued)

OTHER PUBLICATIONS

International Search Report for PCT/IB2024/058430, dated Dec. 19, 2024. Searching Authority, Israel Patent Office, Jerusalem, Israel.
(Continued)

*Primary Examiner* — Hanh B Thai
(74) *Attorney, Agent, or Firm* — M&B IP Analysts, LLC (57) ABSTRACT

A system and method for generating a database query based on a natural language query is presented. The method includes receiving an unstructured natural language query directed to a security database, wherein the security database includes a representation of a computing environment; selecting a group of database queries from a plurality of preexisting database queries based on a similarity to the unstructured natural language query; generating a context for processing by a language model, the context including the selected group of database queries, an identified technology, and a schema of the computing environment; processing a prompt and the generated context utilizing the language model to generate a second database query; and executing the second database query on the security database.

17 Claims, 6 Drawing Sheets

Related U.S. Application Data application No. 18/457,054, filed on Aug. 28, 2023, now abandoned.

(51) Int. Cl.
*G06F 16/242* (2019.01)
*G06F 16/2455* (2019.01)

(58) Field of Classification Search
USPC .......................................................... 707/760
See application file for complete search history.

(56) References Cited

U.S. PATENT DOCUMENTS

| | | | |
|---|---|---|---|
| 7,937,402 B2* | 5/2011 | Feng | G06F 16/9537 |
| | | | 707/765 |
| 8,146,146 B1 | 3/2012 | Coviello et al. | |
| 8,645,122 B1* | 2/2014 | Di Fabbrizio | G06F 40/237 |
| | | | 704/251 |
| 9,141,663 B2* | 9/2015 | Mavrov | G06F 16/2423 |
| 10,127,224 B2* | 11/2018 | Deleeuw | G06F 16/90332 |
| 10,158,677 B1* | 12/2018 | DiCorpo | H04L 63/145 |
| 10,263,838 B2* | 4/2019 | Eda | H04L 67/14 |
| 10,304,444 B2* | 5/2019 | Mathias | G10L 15/22 |
| 10,417,346 B2* | 9/2019 | Kim | G06F 40/40 |
| 10,678,810 B2 | 6/2020 | Rehal | |
| 10,754,877 B2 | 8/2020 | Kassko et al. | |
| 10,789,292 B2* | 9/2020 | Manor | G06F 16/901 |
| 10,922,342 B2* | 2/2021 | Wang | G06N 20/00 |
| 10,997,968 B2* | 5/2021 | Wanas | G10L 15/183 |
| 11,080,607 B1* | 8/2021 | Demtchenko | G06N 3/044 |
| 11,210,268 B2* | 12/2021 | Albrecht | G06F 16/13 |
| 11,303,666 B1 | 4/2022 | Peters et al. | |
| 11,468,054 B2* | 10/2022 | Chaudhuri | G06Q 10/063 |
| 11,469,963 B2 | 10/2022 | Forte et al. | |
| 11,516,158 B1* | 11/2022 | Luzhnica | G06F 40/35 |
| 11,544,282 B1 | 1/2023 | Chor et al. | |
| 11,544,343 B1 | 1/2023 | Bhushan et al. | |
| 11,551,421 B1 | 1/2023 | Bhushan et al. | |
| 11,563,813 B1 | 1/2023 | Bhushan et al. | |
| 11,574,429 B1 | 2/2023 | Tam et al. | |
| 11,579,764 B1 | 2/2023 | Argroves et al. | |
| 11,593,669 B1 | 2/2023 | Chhabra et al. | |
| 11,601,324 B1 | 3/2023 | Fletcher et al. | |
| 11,604,794 B1 | 3/2023 | Nallapati et al. | |
| 11,604,877 B1 | 3/2023 | Gallien et al. | |
| 11,620,541 B1 | 4/2023 | Ghosh et al. | |
| 11,630,695 B1 | 4/2023 | Aleti et al. | |
| 11,644,940 B1 | 5/2023 | Chor et al. | |
| 11,651,571 B1 | 5/2023 | Bhushan et al. | |
| 11,663,109 B1 | 5/2023 | Deaderick et al. | |
| 11,663,382 B1 | 5/2023 | Cascioli | |
| 11,670,062 B1 | 6/2023 | Bhushan et al. | |
| 11,670,288 B1 | 6/2023 | Das et al. | |
| 11,675,473 B1 | 6/2023 | Breeden et al. | |
| 11,675,816 B1 | 6/2023 | Chandrasekharan et al. | |
| 11,676,072 B1 | 6/2023 | Chandrasekharan et al. | |
| 11,676,345 B1 | 6/2023 | Bhushan et al. | |
| 11,676,582 B2* | 6/2023 | Nowak-Przygodzki | |
| | | | G10L 15/1815 |
| | | | 704/270.1 |
| 11,687,413 B1 | 6/2023 | Chen et al. | |
| 11,693,710 B1 | 7/2023 | Aleti et al. | |
| 11,704,219 B1 | 7/2023 | Lerner et al. | |
| 11,714,683 B1 | 8/2023 | Roberts et al. | |
| 11,720,686 B1 | 8/2023 | Cross et al. | |
| 11,726,750 B1* | 8/2023 | Arcadinho | G06F 8/33 |
| | | | 717/113 |
| 11,727,643 B1 | 8/2023 | Bhushan et al. | |
| 11,729,074 B1 | 8/2023 | Mishra et al. | |
| 11,734,886 B1 | 8/2023 | Bhushan et al. | |
| 11,741,131 B1 | 8/2023 | Dwivedi et al. | |
| 11,755,405 B1 | 9/2023 | Satish et al. | |
| 11,762,869 B1 | 9/2023 | Werner | |
| 11,769,017 B1* | 9/2023 | Gray | G06F 40/56 |
| | | | 704/9 |
| 11,782,917 B2* | 10/2023 | Chaudhuri | G06F 3/0482 |
| | | | 704/9 |
| 11,789,940 B2 | 10/2023 | Jiao et al. | |
| 11,809,497 B2 | 11/2023 | Beringer et al. | |
| 11,860,914 B1* | 1/2024 | Qadrud-Din | G06F 40/56 |
| 11,861,320 B1* | 1/2024 | Gajek | G06F 40/40 |
| 11,861,321 B1* | 1/2024 | O'Kelly | G06F 16/33 |
| 11,928,569 B1* | 3/2024 | Douthit | G06F 40/216 |
| 12,001,550 B1* | 6/2024 | Schindel | G06F 21/554 |
| 12,282,502 B2 | 4/2025 | Whitehead, Jr. et al. | |
| 2004/0117189 A1* | 6/2004 | Bennett | G09B 5/04 |
| | | | 704/E15.04 |
| 2005/0131695 A1* | 6/2005 | Lucente | G10L 15/22 |
| | | | 704/E15.04 |
| 2005/0172261 A1 | 8/2005 | Yuknewicz et al. | |
| 2008/0010259 A1* | 1/2008 | Feng | G06F 16/9537 |
| 2008/0091681 A1 | 4/2008 | Dwivedi et al. | |
| 2010/0153412 A1* | 6/2010 | Mavrov | G06F 16/2423 |
| | | | 707/E17.062 |
| 2010/0262454 A1* | 10/2010 | Sommer | G06F 16/355 |
| | | | 706/55 |
| 2010/0287220 A1* | 11/2010 | Aust | G06F 16/284 |
| | | | 707/954 |
| 2013/0018920 A1 | 1/2013 | Griffin | |
| 2014/0095469 A1 | 4/2014 | Chen et al. | |
| 2015/0026219 A1* | 1/2015 | Manor | G06F 16/901 |
| | | | 707/803 |
| 2016/0179787 A1* | 6/2016 | Deleeuw | G10L 15/22 |
| | | | 704/9 |
| 2017/0212884 A1* | 7/2017 | Kim | G06F 40/40 |
| 2017/0278514 A1* | 9/2017 | Mathias | G06F 16/35 |
| 2018/0004870 A1 | 1/2018 | Ohayon et al. | |
| 2018/0052824 A1* | 2/2018 | Ferrydiansyah | G06N 20/00 |
| 2018/0062916 A1* | 3/2018 | Eda | H04L 67/1008 |
| 2018/0137401 A1 | 5/2018 | Kumar et al. | |
| 2019/0222593 A1 | 7/2019 | Craig et al. | |
| 2019/0377824 A1* | 12/2019 | Wang | G06N 5/022 |
| 2020/0244700 A1* | 7/2020 | Moon | G06F 40/35 |
| 2020/0349919 A1* | 11/2020 | Wanas | G10L 15/22 |
| 2020/0394190 A1* | 12/2020 | Chaudhuri | G06F 16/243 |
| 2021/0049158 A1 | 2/2021 | Jiao et al. | |
| 2021/0173829 A1* | 6/2021 | Zeng | G06F 16/24524 |
| 2021/0182489 A1* | 6/2021 | Barkan | G06F 40/284 |
| 2021/0209167 A1 | 7/2021 | Feng et al. | |
| 2021/0272554 A1* | 9/2021 | Robert Jose | G10L 15/26 |
| 2022/0035802 A1* | 2/2022 | Penzo | G06F 3/0481 |
| 2022/0036153 A1* | 2/2022 | O'Malia | G06N 3/042 |
| 2022/0229832 A1* | 7/2022 | Li | G06F 16/24578 |
| 2022/0300542 A1* | 9/2022 | Schwartz | G06F 40/205 |
| 2022/0318507 A1* | 10/2022 | Barkan | G06N 3/045 |
| 2022/0398583 A1 | 12/2022 | Crudele et al. | |
| 2022/0414228 A1* | 12/2022 | Difonzo | G06F 40/169 |
| 2023/0018809 A1 | 1/2023 | Deshmukh | |
| 2023/0061234 A1 | 3/2023 | Calado et al. | |
| 2023/0074406 A1* | 3/2023 | Baeuml | G06F 16/90332 |
| 2023/0078177 A1 | 3/2023 | Wang et al. | |
| 2023/0083512 A1* | 3/2023 | Newman | G06N 3/045 |
| | | | 704/9 |
| 2023/0085500 A1* | 3/2023 | Hong | G06F 16/243 |
| | | | 707/722 |
| 2023/0088034 A1 | 3/2023 | Salman | |
| 2023/0112921 A1* | 4/2023 | Cai | G06F 8/31 |
| | | | 717/104 |
| 2023/0139000 A1 | 5/2023 | Apger et al. | |
| 2023/0142344 A1 | 5/2023 | Nakar | |
| 2023/0161821 A1 | 5/2023 | Beringer et al. | |
| 2023/0164098 A1 | 5/2023 | Cai et al. | |
| 2023/0177363 A1 | 6/2023 | Li et al. | |
| 2023/0222029 A1 | 7/2023 | Vutukuru et al. | |
| 2023/0224324 A1 | 7/2023 | Karabey et al. | |
| 2023/0224377 A1 | 7/2023 | Bathla et al. | |
| 2023/0237053 A1* | 7/2023 | Dangoor | G06F 16/24539 |
| | | | 707/767 |
| 2023/0237277 A1* | 7/2023 | Reza | G06F 40/186 |
| | | | 704/9 |

(56) References Cited

U.S. PATENT DOCUMENTS

| | | | |
|---|---|---|---|
| 2023/0244938 A1* | 8/2023 | Wei | G06N 3/045 706/25 |
| 2023/0252140 A1 | 8/2023 | Coulter | |
| 2023/0259705 A1* | 8/2023 | Tunstall-Pedoe | G06N 3/0499 704/9 |
| 2023/0274086 A1* | 8/2023 | Tunstall-Pedoe | G06F 16/3344 704/9 |
| 2023/0274094 A1* | 8/2023 | Tunstall-Pedoe | G06F 40/30 704/9 |
| 2023/0274733 A1* | 8/2023 | Nowak-Przygodzki | G06F 16/909 704/270.1 |
| 2023/0316001 A1* | 10/2023 | Araki | G06F 40/35 |
| 2023/0319074 A1 | 10/2023 | Murphy et al. | |
| 2023/0319097 A1 | 10/2023 | Murphy et al. | |
| 2023/0325154 A1* | 10/2023 | Arcadinho | G06F 40/40 717/113 |
| 2023/0325725 A1* | 10/2023 | Lester | G06V 10/7747 |
| 2023/0351026 A1 | 11/2023 | Cross et al. | |
| 2024/0020538 A1* | 1/2024 | Socher | G06N 3/084 |
| 2024/0062016 A1* | 2/2024 | Tong | G06F 40/20 |
| 2024/0403273 A1 | 12/2024 | Zangri et al. | |
| 2024/0403428 A1 | 12/2024 | Lal et al. | |
| 2024/0419918 A1 | 12/2024 | Vangala et al. | |
| 2024/0427810 A1 | 12/2024 | Tishbi et al. | |
| 2025/0200027 A1* | 6/2025 | Fu | G06F 16/24522 |

OTHER PUBLICATIONS

Written Opinion of the Searching Authority for PCT/IB2024/058430, dated Dec. 19, 2024. Searching Authority, Israel Patent Office, Jerusalem, Israel.

* cited by examiner

SYSTEM AND METHOD FOR IMPROVING EFFICIENCY IN NATURAL LANGUAGE QUERY PROCESSING UTILIZING LANGUAGE MODEL

CROSS-REFERENCED TO RELATED APPLICATION

This application is a continuation-in-part of U.S. Non-Provisional application Ser. No. 18/651,037, filed Apr. 30, 2024, which itself is a continuation of U.S. Non-Provisional application Ser. No. 18/457,054, filed Aug. 28, 2023, the contents of which are hereby incorporated by reference.

TECHNICAL FIELD

The present disclosure relates generally to large language models, and specifically to efficiently generating database queries based off of natural language queries.

BACKGROUND

Computer systems generate increasingly more data. As more and more data is generated, solutions arise to problems relating to storing, accessing, deleting, and managing this data.

One method of organizing and storing data is referred to as structured data storage. Structured data is implemented where data is structured, e.g., using a data schema, data model, and the like, and a persistent order to the data is realized.

Structured data solutions are extremely useful for computer systems, however, they are not always human friendly. In other words, a data structure, such as a SQL database, makes it easier for a machine to store data, retrieve data, manage data, etc., but requires a human to learn a special query language which the machine uses to retrieve and store data, for example.

Humans tend to converse in natural language, which does not have the rigid structure of machine languages. Increasingly, natural language processing techniques allow users to generate statements, queries, and the like, which a machine translates to a computer language, and executes on an appropriate data set.

A recurring issue with such processes is a lack of context, and a reliance on statistics of what other users search for. For example, for the natural language query "what is jay?", a computer has no way of discerning between the English letter "J", the given name "Jay", and a commonly used name of a North American bird species, just to give a few examples.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include receiving an unstructured natural language query directed to a security database, where the security database includes a representation of a computing environment. The method. The method may also include selecting a group of database queries from a plurality of preexisting database queries based on a similarity to the unstructured natural language query. The method. The method may furthermore include generating a context for processing by a language model, the context including the selected group of database queries, an identified technology, and a schema of the computing environment. The method. The method may in addition include processing a prompt and the generated context utilizing the language model to generate a second database query. The method. The method may moreover include executing the second database query on the security database. Other embodiments of this aspect include corresponding computer systems, apparatus, and computer programs recorded on one or more computer storage devices, each configured to perform the actions of the methods.

Implementations may include one or more of the following features. The method. The method where selecting the group of database queries further may include: vectorizing each of: the preexisting database queries and the unstructured natural language query; determining a similarity score between vector of a preexisting database query and a vector of the unstructured natural language query; and selecting preexisting database queries based on a similarity score exceeding a predetermined threshold. The method. The method may include: re-ranking the selected preexisting database queries; and generating the context based on the re-ranked preexisting database queries. The method. The method may include: generating the prompt for a large language model based on the unstructured natural language query and the a first database query. The method. The method may include: determining a data schema, the data schema utilized to represent an entity of the computing environment; and generating the prompt further based on the determined data schema. The method. The method may include: determining the data schema based on the unstructured natural language query. The method. The method may include: generating the prompt further based on a technology identifier, the technology identifier determined based on data extracted from the unstructured natural language query. The method. The method may include: parsing the received natural language query to a textual input including a plurality of text elements; and matching a text element of the plurality of text elements to a data schema. Implementations of the described techniques may include hardware, a method or process, or a computer tangible medium.

In one general aspect, a non-transitory computer-readable medium may include one or more instructions that, when executed by one or more processors of a device, cause the device to: receive an unstructured natural language query directed to a security database, where the security database includes a representation of a computing environment; select a group of database queries from a plurality of preexisting database queries based on a similarity to the unstructured natural language query; generate a context for processing by a language model, the context including the selected group of database queries, an identified technology, and a schema of the computing environment; process a prompt and the generated context utilizing the language model to generate a second database query; and execute the second database query on the security database. Other embodiments of this aspect include corresponding computer systems, apparatus, and computer programs recorded on one or more computer storage devices, each configured to perform the actions of the methods.

In one general aspect, a non-transitory computer-readable medium may include one or more instructions that, when executed by one or more processors of a device, cause the device to: receive an unstructured natural language query directed to a security database, where the security database includes a representation of a computing environment; select a group of database queries from a plurality of preexisting database queries based on a similarity to the unstructured natural language query; generate a context for processing by a language model, the context including the selected group of database queries, an identified technology, and a schema of the computing environment; process a prompt and the generated context utilizing the language model to generate a second database query; and execute the second database query on the security database. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: receive an unstructured natural language query directed to a security database, where the security database includes a representation of a computing environment. The system may in addition select a group of database queries from a plurality of preexisting database queries based on a similarity to the unstructured natural language query. The system may moreover generate a context for processing by a language model, the context including the selected group of database queries, an identified technology, and a schema of the computing environment. The system may also process a prompt and the generated context utilizing the language model to generate a second database query. The system may furthermore execute the second database query on the security database. Other embodiments of this aspect include corresponding computer systems, apparatus, and computer programs recorded on one or more computer storage devices, each configured to perform the actions of the methods.

Implementations may include one or more of the following features. The system where the memory contains further instructions that, when executed by the processing circuitry for selecting the group of database queries, further configure the system to: vectorize each of: the preexisting database queries and the unstructured natural language query; determine a similarity score between vector of a preexisting database query and a vector of the unstructured natural language query; and select preexisting database queries based on a similarity score exceeding a predetermined threshold. The system where the memory contains further instructions which when executed by the processing circuitry further configure the system to: re-rank the selected preexisting database queries; and generate the context based on the re-ranked preexisting database queries. The system where the memory contains further instructions which when executed by the processing circuitry further configure the system to: generate the prompt for a large language model based on the unstructured natural language query and the a first database query. The system where the memory contains further instructions which when executed by the processing circuitry further configure the system to: determine a data schema, the data schema utilized to represent an entity of the computing environment; and generate the prompt further based on the determined data schema. The system where the memory contains further instructions which when executed by the processing circuitry further configure the system to: determine the data schema based on the unstructured natural language query. The system where the memory contains further instructions which when executed by the processing circuitry further configure the system to: generate the prompt further based on a technology identifier, the technology identifier determined based on data extracted from the unstructured natural language query. The system where the memory contains further instructions which when executed by the processing circuitry further configure the system to: parse the received natural language query to a textual input including a plurality of text elements; and match a text element of the plurality of text elements to a data schema. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for querying a security database including a representation of a computing environment. In an embodiment, a natural language query, a statement, a combination thereof, and the like, are received. In some embodiments, the natural language query is converted to a database query (i.e., a database query is generated based on the natural language query), and executed on a security database which includes a representation of a computing environment, such as a cloud computing environment, a hybrid environment, a local environment, and the like.

In an embodiment, generating a database query is performed by utilizing a large language model (LLM). For example, according to an embodiment, the natural language query is received, and a prompt is generated for an LLM based on the natural language query. In an embodiment, the prompt is based on a template, such that when the prompt is generated, the LLM outputs a database query which is determined by utilizing the LLM to be the closest match to the natural language query. In some embodiments, a closest database query is determined by utilizing a classifier, a natural language processor, combinations thereof, and the like. For example, in an embodiment, a closest database query is determined from a plurality of preexisting database queries based on, e.g., Word2Vec.

In some embodiments, the closest matching database query and the natural language query are provided to an LLM to generate a database query for a security database. According to an embodiment, a data schema, data template, a combination thereof, and the like, is further provided to the LLM to generate the database query for the security database. In an embodiment, this is advantageous as it reduces the need to fine-tune or otherwise train an LLM on the plurality of queries, on a data schema of the security database, a combination thereof, and the like. Thus, converting a natural language query into a database query is improved by reducing the need to further tune, train, and the like, the LLM.

Figure 1:
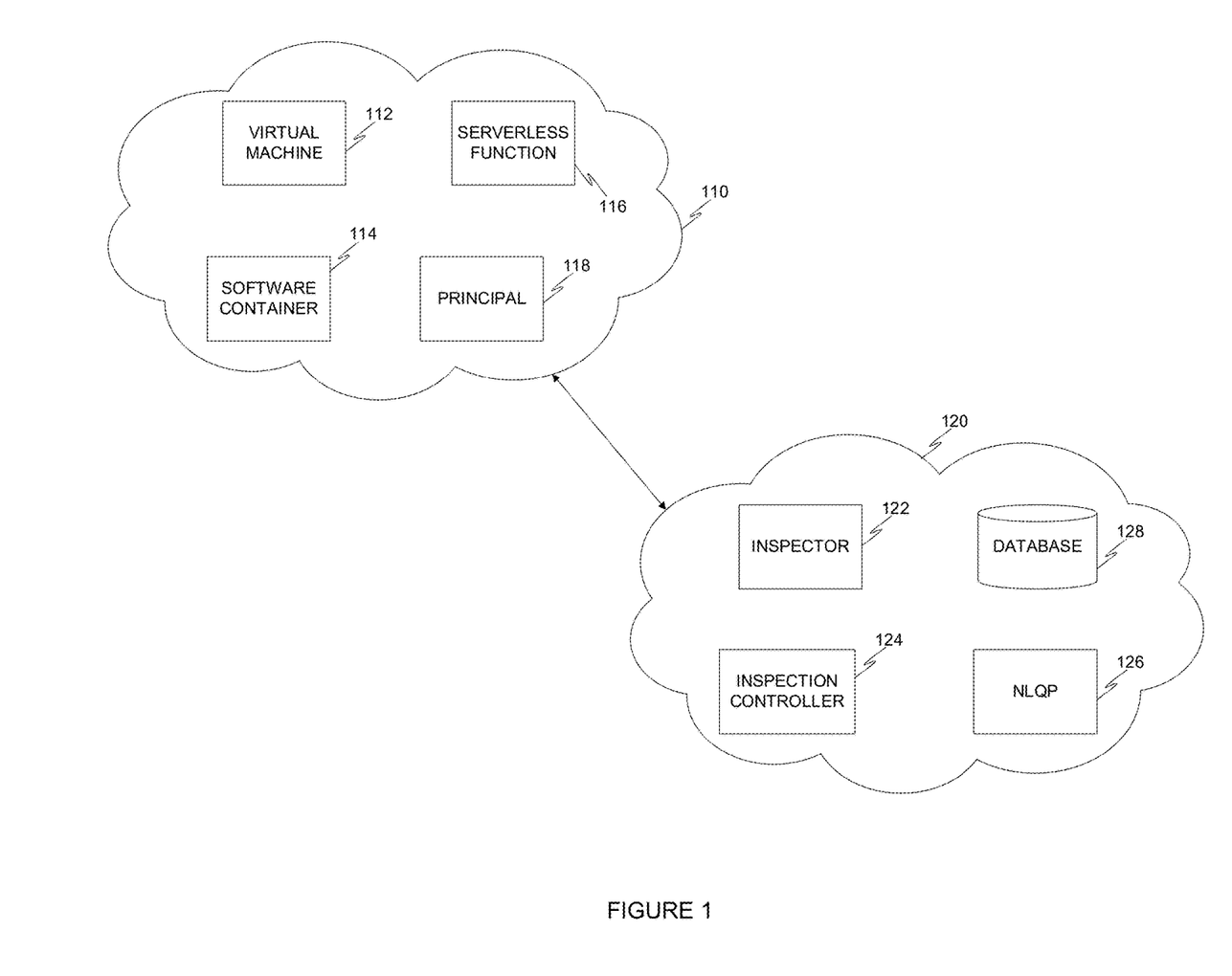
FIG. 1 is an example schematic diagram of a computing environment communicatively coupled with a cybersecurity inspection environment, utilized to describe an embodiment.

FIG. 1 is an example schematic diagram of a computing environment communicatively coupled with a cybersecurity inspection environment, utilized to describe an embodiment. A computing environment 110 is, according to an embodiment, a cloud computing environment, a networked environment, an on-premises environment, a combination thereof, and the like.

For example, in an embodiment, a cloud computing environment is implemented as a virtual private cloud (VPC), a virtual network (VNet), and the like, on a cloud computing infrastructure. A cloud computing infrastructure is, according to an embodiment, Amazon® Web Services (AWS), Google® Cloud Platform (GCP), Microsoft® Azure, and the like.

In certain embodiment, the computing environment 110 includes a plurality of entities. An entity in a computing environment 110 is, for example, a resource, a principal 118, and the like. A resource is, according to an embodiment, a hardware, a baremetal machine, a virtual machine, a virtual workload, a provisioned hardware (or portion thereof, such as a processor, a memory, a storage, etc.), and the like.

A principal 118 is an entity which is authorized to perform an action on a resource, initiate an action in the computing environment 110, initiate actions with respect to other principals, a combination thereof, and the like. According to an embodiment, a principal is a user account, a service account, a role, a combination thereof, and the like.

In certain embodiments, a resource in a computing environment is a virtual machine 112, a software container 114, a serverless function 116, and the like. For example, in an embodiment, a virtual machine 112 is implemented as an Oracle® VirtualBox®. In some embodiments, a software container 114 is implemented utilizing a Docker® Engine, a Kubernetes® platform, combinations thereof, and the like. In certain embodiments, a serverless function 116 is implemented in AWS utilizing Amazon Lambda®.

In some embodiments, the computing environment 110 is implemented as a cloud environment which includes multiple computing environments. For example, a first cloud computing environment is utilized as a production environment, a second cloud computing environment is utilized as a staging environment, a third cloud computing environment is utilized as a development environment, and so on. Each such environment includes, according to an embodiment, a resource, a principal, and the like, having a counterpart in the other environments.

For example, according to an embodiment, a first virtual machine 112 is deployed in a production environment, and a corresponding first virtual machine is deployed in a staging environment, which is essentially identical to the production environment.

In an embodiment, the computing environment 110 is monitored by an inspection environment 120. According to an embodiment, the inspection environment 120 is configured to inspect, scan, detect, and the like, cybersecurity threats, cybersecurity risks, cybersecurity objects, misconfigurations, vulnerabilities, exploitations, malware, combinations thereof, and the like.

In certain embodiments, the inspection environment 120 is further configured to provide a mitigation action, a remediation action, a forensic finding, a combination thereof, and the like.

In some embodiments, an inspector 122 is configured to detect a cybersecurity object in a workload deployed in the computing environment 110. For example, in an embodiment, the inspector is a software container pod configured to detect a predetermined cybersecurity object in a disk, access to which is provided to the inspector 122 by, for example, the inspection controller 124.

In an embodiment, a cybersecurity object is a password stored in cleartext, a password stored in plaintext, a hash, a certificate, a cryptographic key, a private key, a public key, a hash of a file, a signature of a file, a malware object, a code object, an application, an operating system, a combination thereof, and the like.

In certain embodiments, the inspector 122 is assigned to inspect a workload in the computing environment 110 by an inspection controller 124. In an embodiment, the inspection controller initiates inspection by, for example, generating an inspectable disk based on an original disk. In an embodiment, generating the inspectable disk include generating a copy, a clone, a snapshot, a combination thereof, and the like, of a disk of a workload deployed in the computing environment 110, and providing access to the inspectable disk (for example by assigning a persistent volume claim) to an inspector 122.

In an embodiment, where an inspector 122 detects a cybersecurity object in a disk of a workload, a representation is generated and stored in a security database 128. In certain embodiments, the database is a columnar database, a graph database, a structured database, an unstructured database, a combination thereof, and the like. In certain embodiments, the representation is generated based on a predefined data schema. For example, a first data schema is utilized to generate a representation of a resource, a second data schema is utilized to generate a representation of a principal, a third data schema is utilized to generated a representation of a cybersecurity object, etc.

For example, according to an embodiment, the representation is stored on a graph database, such as Neo4j®. In certain embodiments, a resource is represented by a resource node in the security graph, a principal is represented by a principal node in the security graph, etc.

In some embodiments, the inspection environment 120 further includes a natural language query processor 126 (NLQP 126). In an embodiment, the NLQP 126 is configured to receive a query in a natural language, and generate, based on the received query, a structured query which is executable on the database 128.

In certain embodiments, it is advantageous to provide a user with an interface to query the database 128 in a natural language. It is further advantageous to provide a system and method that provides accurate translation between a query received in natural language and a database query, in order to provide a user with a relevant result to their query.

Figure 2:
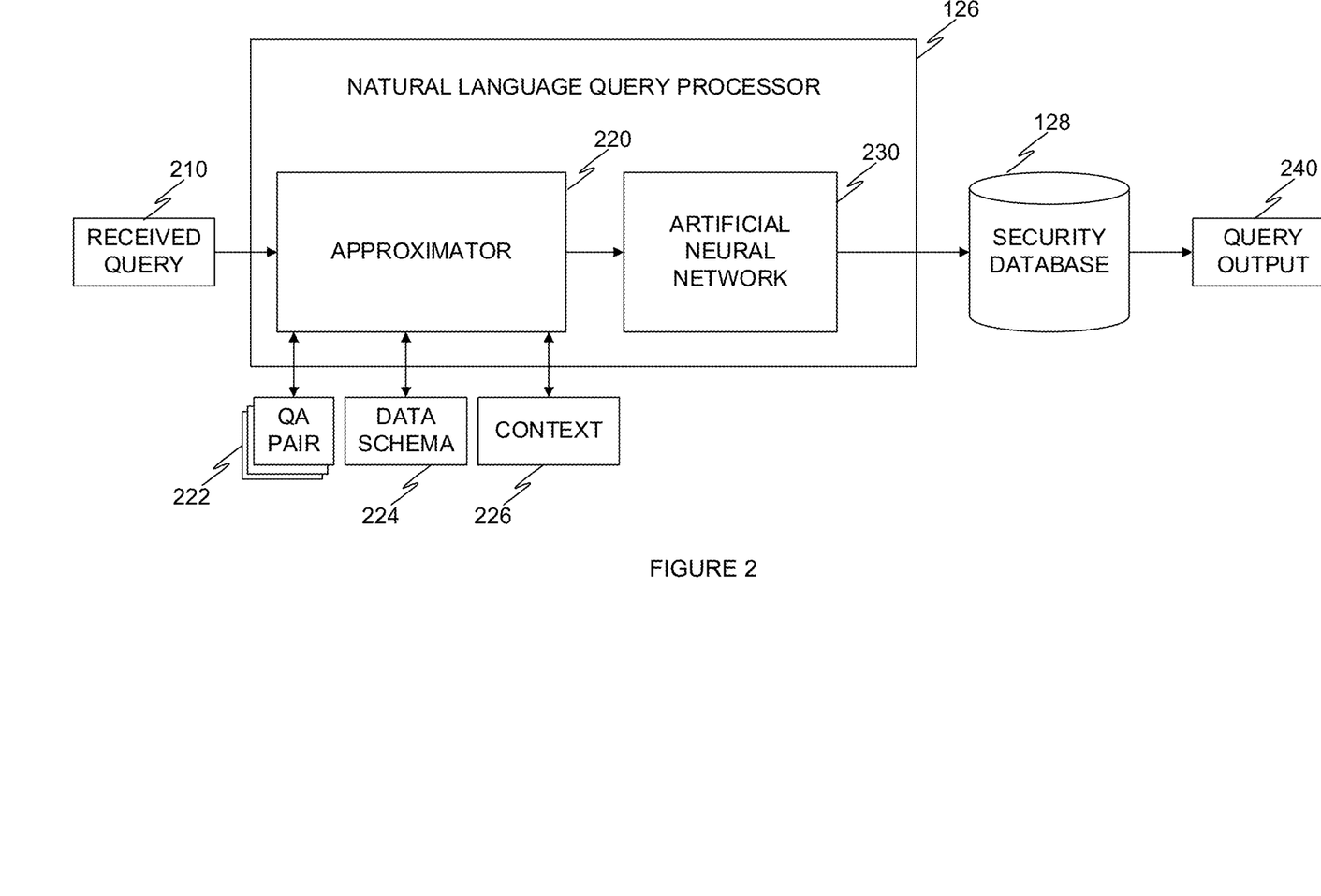
FIG. 2 is an example schematic illustration of a natural language query processor, implemented in accordance with an embodiment.

FIG. 2 is an example schematic illustration of a natural language query processor, implemented in accordance with an embodiment. In certain embodiments, the natural language query processor 126 (NLQP 126) is implemented as a virtual workload in an inspection environment. In some embodiments, the NLQP 126 includes an approximator 220, and an artificial neural network (ANN) 230. In some embodiments, the ANN 230 is a large language model, such as GPT, BERT, and the like.

In an embodiment, the NLQP 126 receives a query 210. In some embodiments, the received query 210 is a query in natural language, such as an English language query. In an embodiment, the received query 210 cannot be executed on a database, such as security database 128. In certain embodiments, the security database 128 includes a representation of a computing environment, such as the computing environment 110 of FIG. 1 above.

In an embodiment, the received query 210 is provided to the approximator 220. In an embodiment, the approximator 220 includes a large language model (LLM), such as GPT, BERT, and the like. In other embodiments, a language model is utilized by the approximator 220, such as a large language model, a small language model, and the like.

In some embodiments, the LLM (e.g., of the approximator 220, the ANN 230, etc.) includes a fine-tuning mechanism. In an embodiment, fine-tuning allows to freeze some weights of a neural network while adapting others based on training data which is unique to a particular set of data.

In certain embodiments, an LLM cannot be fine-tuned, for example due to a lack of access to weights of the model. In such embodiments, it is advantageous to provide the LLM with additional data, such as context, in order to generate a result which is accurate and relevant.

For example, in an embodiment, the approximator 220 is provided with a plurality of query-answer (QA) pairs 222, a data schema 224, additional context 226, a combination thereof, and the like. In an embodiment, the QA pairs 222 each include a database query and a corresponding response. In some embodiments, the query of the QA pair 222 is a query which was previously executed on the database 128.

In some embodiments, the data schema 224 is a data schema of the database 128. In some embodiments, a plurality of data schemas 224 are utilized. For example, in an embodiment, the plurality of data schemas 224 include a data schema for a principal, a data schema for a resource, a data schema of a cloud computing environment, combinations thereof, and the like.

In certain embodiments, additional context 226 includes information related to a tech stack, information related to configuration of a technology, and the like. In an embodiment, a tech stack includes application identifiers, machine identifiers (e.g., t2.micro), configuration values, a combination thereof, and the like. For example, a tech stack includes, according to an embodiment, Ubuntu™4.10, Nginx® 1.27.3, configurations thereof, and the like.

In an embodiment, the approximator 220 is configured to generate a prompt based on a predetermined template, the received query 210, a QA pair 222, the data schema 224, context 226, a combination thereof, and the like. In some embodiments, the approximator is configured to receive the query 210 and generate a selection of a QA pair 222 from a plurality of QA pairs. For example, in an embodiment, the approximator is configured to receive the query 210, and generate a prompt for an LLM to detect from a plurality of QA pairs, a QA pair 222 which is the closest match to the received query 222. In some embodiments, the prompt further includes the data schema 224.

In an embodiment, the output of the approximator 220 is a QA pair 222 which an LLM of the approximator 220 outputs as being the closest match to the received query 210. In some embodiments, the approximator 220 outputs a group of QA pairs from the plurality of QA pairs.

According to an embodiment, QA pairs 222 are clustered into groups. For example, in an embodiment, a query is anonymized by removing sensitive data, and the anonymized query is then embedded into a vector of a feature space. In some embodiments, a language model is utilized to embed the anonymized query into a vector. In certain embodiments, the feature space utilizes a reduced dimensionality, for example by utilizing Uniform Manifold Approximation and Projection (UMAP). In an embodiment, the vectors of the reduced feature space are clustered to detect unique topics. In some embodiments, a query is selected from each cluster as a representative query.

In an embodiment, a received query 210 is matched (e.g., based on cosine distance) to a representative query from the plurality of QA pairs 222. In certain embodiments, a plurality of QA pairs are selected, each selected based on a corresponding representative query (e.g., based on a match score exceeding a predetermined threshold), wherein each representative query is associated with a different query cluster.

In certain embodiments, the output of the approximator 220 is provided to the ANN 230. In an embodiment, the ANN 230 is configured to generate a database query (i.e., a query which is executable by a database, database management system, etc.) based on the output of the approximator 220. In some embodiments, the ANN 230 includes an LLM and is configured to generate a prompt for the LLM based on the received output, the received query 210, and the data schema 224.

For example, in an embodiment, the ANN 230 is configured to receive the query 210, a QA pair 222 selected by the approximator 220, the data schema 224, and the context 226 as inputs. The ANN 230 is further configured to generate a prompt for an LLM based on the received inputs, which, according to an embodiment, configures the LLM to output a database query based on the received inputs.

In an embodiment, a first AI model is configured to select a plurality of similar queries from the plurality of QA pairs 222. For example, in some embodiments, the first AI model is configured to determine a similarity, such as a cosine similarity, between a received query and a plurality of queries from the QA pairs 222.

According to an embodiment, a maximal marginal relevance (MMR) technique is utilized by the approximator 220 to select a group of queries from the plurality of queries of the QA pairs 222, and generate a query, for execution on the security database 128, based on the selected group of queries. In an embodiment, an MMR technique is utilized to introduce higher variance in the context 226, which is provided to a language model, thus increasing a probability that the language model outputs a desirable output.

In an embodiment, the outputted database query is executed on a database 128 to provide a query output 240. In an embodiment, a plurality of database queries are outputted by the NLQP 126, each of which is executed on a database, such as database 128. In such embodiments, a plurality of query outputs 240 are generated.

In some embodiments, the query output 240 is provided to a client device, a user account, a user interface, rendered for display on a graphical user interface, a combination thereof, and the like.

Figure 3:
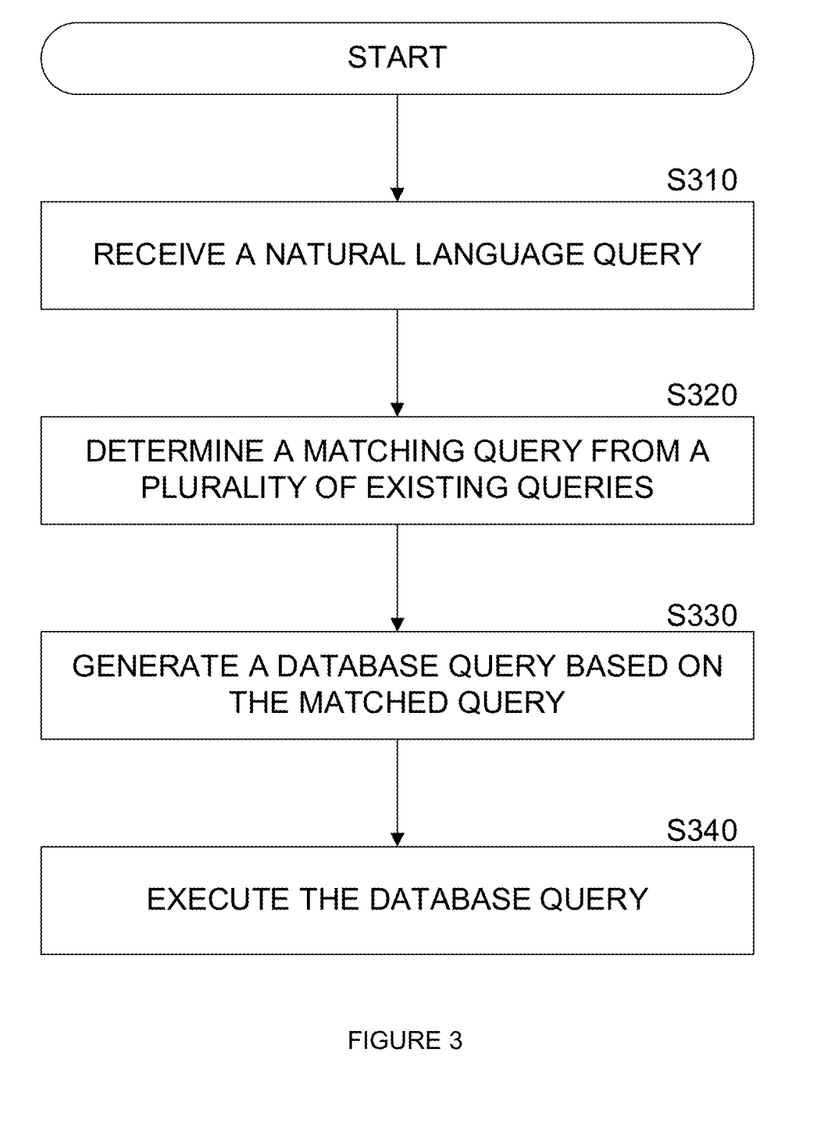
FIG. 3 is an example flowchart of a method for generating a database query based on a natural language query, implemented in accordance with an embodiment.

FIG. 3 is an example flowchart of a method for generating a database query based on a natural language query, implemented in accordance with an embodiment. In an embodiment, the method is performed by utilizing an artificial neural network.

At S310, a natural language query is received. In an embodiment, the natural language query is received through a user interface, a graphical user interface, and the like. In some embodiments, a natural language query is an unstructured query, a partially structured query, and the like. For example, a structured query is a query which can be executed on a database to produce a result, whereas an unstructured query, a partially structured query, and the like, cannot be executed on a database to produce a result, according to an embodiment.

For example, according to an embodiment, a natural language query is "public ECRs with container images that contain cloud keys", "find all vulnerabilities that can be exploited remotely", "find all vulnerabilities that lead to information disclosure".

In some embodiments, the natural language query is processed for tokenization. In an embodiment, each word in the natural language query is mapped to a tokenized word, tokenized word portion, and the like. For example, in an embodiment, vulnerability, vulnerabilities, vulnerabilites (with an incorrect spelling) are all mapped to a single term (e.g., "vulnerable"), and the single term is tokenized. This is advantageous as the context is preserved while tokenization is minimized, since only a single term is tokenized, rather than having to tokenize each different term.

At S320, an existing query is selected. In an embodiment, the existing query is an existing database query. In some embodiments, the selection includes a query pair, including a database query and a response, result, and the like, which is generated based on execution of the database query on a database.

In an embodiment, the existing query is selected from a group of preselected queries. In some embodiments, a match is determined between the natural language query and a plurality of existing queries. In certain embodiments, generating a match includes determining a match score. For example, in an embodiment, a match score is generated between a natural language query and a preexisting database query based on natural language processing (NLP) techniques, such as the distance-based Word2Vec.

For example, in an embodiment, a distance is determined between the received natural language query and a first preexisting database query, and between the received natural language query and a second preexisting database query. In certain embodiments, the preexisting query having a shorter distance to the natural language query is selected as the matched query.

At S330, a database query is generated. In an embodiment, the database query is generated based on the received natural language query and the selected existing query. In certain embodiments, the database query is generated by adapting the existing query to the received natural language query. In an embodiment, adapting the existing query based on the received natural language query is performed by an artificial neural network, such as a generative ANN. In some embodiments, the adaptation is performed by a generative adversarial network (GAN), which includes a generator network and a discriminator network.

At S340, the database query is executed. In an embodiment, executing a database query includes configuring a database management system to receive a database query, execute the database query on one or more datasets stored in the database, and generate a result.

In certain embodiments, where a plurality of database queries are generated, each query is executed on a database. According to an embodiment, each query is executed on the same database, a different database, a combination thereof, and the like.

Figure 4:
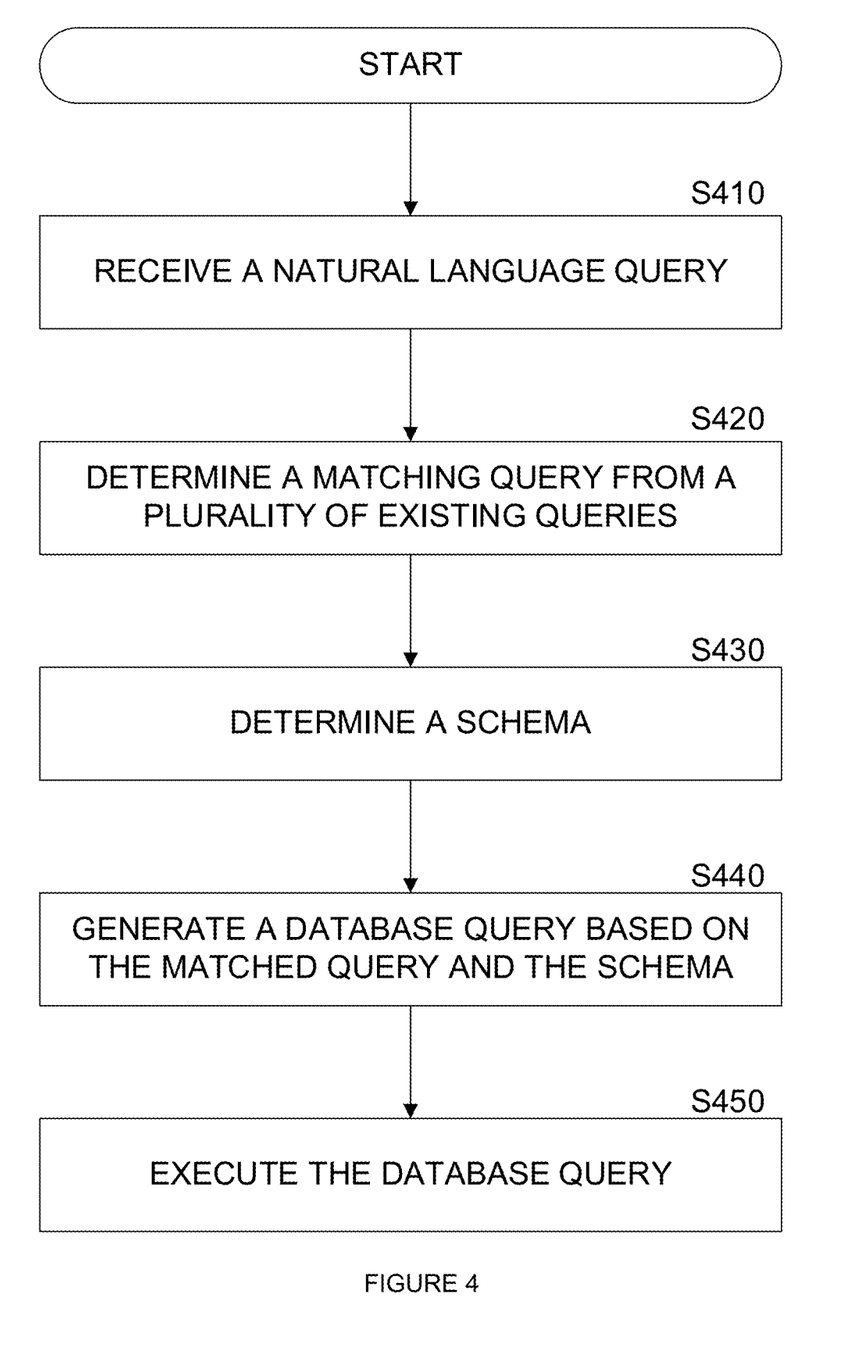
FIG. 4 is an example flowchart of a method for generating a database query based on a natural language query utilizing a large language model, implemented in accordance with an embodiment.

FIG. 4 is an example flowchart of a method for generating a database query based on a natural language query utilizing a large language model, implemented in accordance with an embodiment. In an embodiment, the method is performed by utilizing an artificial neural network such as an LLM. For example, an LLM is, according to an embodiment, GPT, BERT, and the like.

At S410, a natural language query is received. In an embodiment, the natural language query is received through a user interface, a graphical user interface, and the like. In some embodiments, a natural language query is an unstructured query, a partially structured query, and the like. For example, a structured query is a query which can be executed on a database to produce a result, whereas an unstructured query, a partially structured query, and the like, cannot be executed on a database to produce a result, according to an embodiment.

For example, according to an embodiment, a natural language query is "public ECRs with container images that contain cloud keys", "find all vulnerabilities that can be exploited remotely", "find all vulnerabilities that lead to information disclosure".

In some embodiments, the natural language query is processed for tokenization. In an embodiment, each word in the natural language query is mapped to a tokenized word, tokenized word portion, and the like. For example, in an embodiment, vulnerability, vulnerabilities, vulnerabilites (with an incorrect spelling) are all mapped to a single term (e.g., "vulnerable"), and the single term is tokenized. This is advantageous as the context is preserved while tokenization is minimized, since only a single term is tokenized, rather than having to tokenize each different term.

At S420, an existing query is selected. In an embodiment, the existing query is an existing database query. In some embodiments, the selection includes a query pair, including a database query and a response, result, and the like, which is generated based on execution of the database query on a database.

In an embodiment, the existing query is selected from a group of preselected queries. In an embodiment, an LLM is provided with a generated prompt to select a query from the group of preselected queries. In certain embodiments, the prompt is generated based on a preexisting template. For example, in an embodiment, the prompt is generated based on a template, the received query, a data schema, a combination thereof, and the like. In some embodiments, the LLM is configured to select a database query from the preselected queries which mostly resembles the natural language query.

At S430, a data schema is determined. In certain embodiments, a plurality of data schemas are determined. In an embodiment, the data schema is determined based on the natural language query. For example, in an embodiment, a keyword, a phrase, and the like, are detected in the natural language query. In an embodiment, a schema is selected based on the selected query. For example, according to an embodiment, a selected query is parsed to determine a data schema based on elements of the query.

In some embodiments, the natural language query is received as a text input which is parsed, and a keyword is detected in the parsed text. In an embodiment, the keyword, phrase, and the like, is matched to a data schema.

For example, in the natural language query "public ECRs with container images that contain cloud keys", the keyword "container" corresponds to a data schema of a resource, and the keyword "cloud keys" corresponds to a data schema of an identity.

At S440, a database query is generated. In an embodiment, the database query is generated based on the received natural language query and the selected existing query. In certain embodiments, the database query is generated by adapting the existing query to the received natural language query.

In an embodiment, the database query is generated as an output of an LLM. For example, according to an embodiment, an LLM is configured to receive a prompt, which is generated based on a template. In an embodiment, the template is adapted to the prompt based on the received natural language query, the selected database query, the determined schema, a combination thereof, and the like.

At S440, the database query is executed. In an embodiment, executing a database query includes configuring a database management system to receive a database query, execute the database query on one or more datasets stored in the database, and generate a result.

In certain embodiments, where a plurality of database queries are generated, each query is executed on a database. According to an embodiment, each query is executed on the same database, a different database, a combination thereof, and the like.

Figure 5:
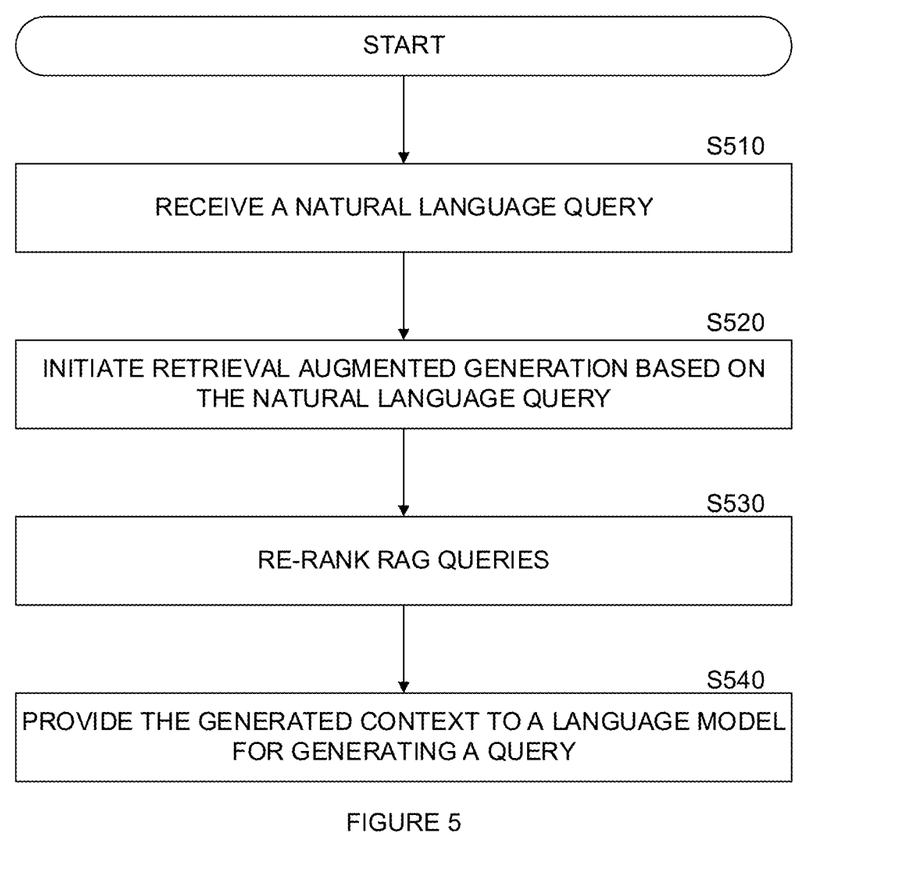
FIG. 5 is an example flowchart of a method for improving efficiency in natural language querying of a security database, implemented in accordance with an embodiment.

FIG. 5 is an example flowchart of a method for improving efficiency in natural language querying of a security database, implemented in accordance with an embodiment. In an embodiment, querying a security database includes executing a query in a language, such as JSON, which requires specialized knowledge. It is advantageous, according to an embodiment, to generate such queries based on natural language utilizing a language model, such as a large language model (LLM).

At S510, a natural language query is received. In an embodiment, the natural language query includes a structured query, a portion of a structured query, and the like, and a natural language query portion. According to an embodiment, a natural language query is an unstructured query, i.e., which is not for execution on a database management system, for example.

In an embodiment, sensitive data, identifying data, proprietary data, and the like, are detected and extracted from the natural language query to generate an anonymized query. In some embodiments, the query, the anonymized query, and the like, are vectorized.

According to an embodiment, vectorizing a query includes generating a vector in a feature space to represent the query. In some embodiments, a plurality of vectors are generated for each query, each vector corresponding to a feature space having a certain number of dimensions. In an embodiment, the dimensionality of the vector is reduced from a first feature space to a second feature space, such that a first vector is in the first feature space, and a second vector, corresponding to the first vector, is in the second feature space.

At S520, retrieval-augmented generation is initiated. In an embodiment, initiating RAG includes detecting a similar query from previously executed queries. For example, in an embodiment, a plurality of queries are detected based on a match between a vector representing the received natural language query, and a vector representing a query of the plurality of query-answer (QA) pairs. In some embodiments, initiating RAG includes detecting a similar query from a set of predetermined queries.

In an embodiment, a match is determined based on a cosine distance between each of a plurality of vectors. In some embodiments, each query of the QA pairs represents a cluster of queries, which are clustered based on similarity. According to an embodiment, a query representing the cluster is a query whose vector has the shortest distance to every other vector in the cluster.

In some embodiments, additional context is generated for a prompt for a language model. For example, in an embodiment, RAG includes detecting example queries from preexisting queries, detecting queries from auto-generated queries, detecting a database schema, detecting a technology stack referred to in a query, a combination thereof, and the like.

In certain embodiments, a technology stack includes software applications, binaries, libraries, code objects, various configurations thereof, combinations thereof, and the like, which are utilized in a computing environment. In an embodiment, a tech stack is detected in a query, for example, by parsing the query and matching expressions detected in the query to identifiers stored in a database having listed therein numerous technology identifiers.

In an embodiment, the additional context is further utilized in generating a structured query based on the received natural language query. Utilizing RAG allows to provide a language model (i.e., small language model, large language model, etc.) with a context window that improves the accuracy of a result of processing a prompt by the language model. In some embodiments, a first RAG input is generated based on preexisting example queries, and a second RAG input is generated based on generated queries. For example, in an embodiment, the first RAG input is generated based on matching the received natural language query to at least a preexisting example query. In an embodiment, the second RAG input is generated based at least on a generated query, wherein the generated query is generated based on the received natural language query.

At S530, RAG elements are re-ranked. In an embodiment, a plurality of contextual elements are detected. A contextual element is an element which can potentially be utilized by a language model in a context window when processing a prompt.

According to an embodiment, generating a context which includes a variance of data increases the accuracy of an output generated by a language model based on a prompt. In an embodiment, a predetermined amount of data is selected for the context window of a language model. In some embodiments, the data is selected based on a rank. In an embodiment, ranking is performed based on a similarity score (e.g., a cosine distance).

In certain embodiments, an MMR technique is used to re-rank (i.e., adjust similarity scores) of queries, data, and the like, which is selected for a context window. For example, in an embodiment, a natural language query is "A virtual machine containing sensitive data and an AI model that is exposed to the internet". Structures queries which correspond to the following are determined to be potential context data:

- VM with access to sensitive data and malicious activity
- VM with sensitive data was targeted by a failed brute force attack
- Application endpoint on a VM/serverless exposes sensitive data
- Publicly exposed VM/serverless with sensitive data
- Publicly exposed VM with a high/critical severity network vulnerability with a known exploit and sensitive data In an embodiment, an MMR technique is utilized to selected queries which correspond to:

- VM with access to sensitive data and malicious activity
- show me virtual machines exposed to the internet with unencrypted secrets
- Hosted AI Models
- VMs are open to Internet on port 80
- Publicly exposed container with data access to sensitive data Utilizing a RAG technique with MMR introduces additional variance into the context for the language model, which allows to enhance the accuracy of query generation, according to an embodiment.

At S540, context is generated for a language model. In an embodiment, the context includes the re-ranked queries. In certain embodiments, the context includes data of a tech stack, similar queries, re-ranked similar queries, a combination thereof, and the like.

In certain embodiments, the context is utilized by a language model, such as a large language model, to generate a structured query, for example based on the context and a prompt. In an embodiment, the prompt is generated based on a predetermined prompt template.

According to an embodiment, the structured query is executed on a security database, which includes a representation of a computing environment, a plurality of computing environments, etc. In an embodiment, the structured query is stored in a JSON format.

Figure 6:
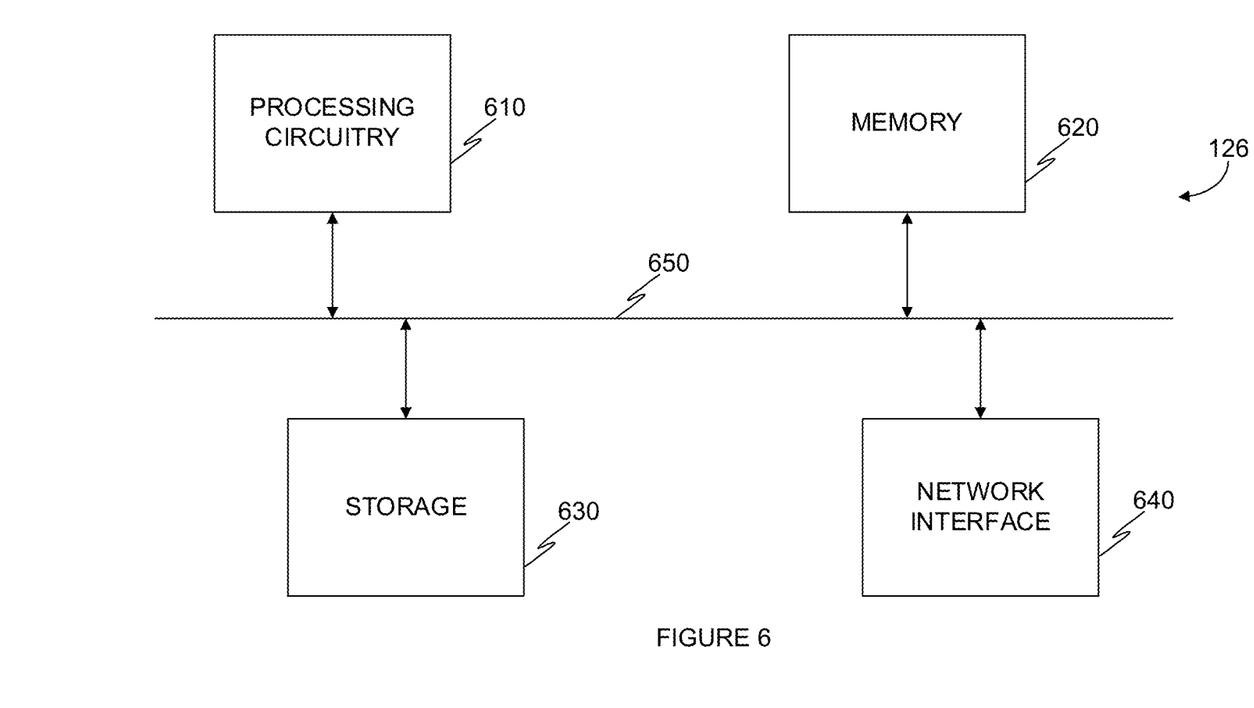
FIG. 6 is an example schematic diagram of a natural language query processor according to an embodiment.

FIG. 6 is an example schematic diagram of a natural language query processor 126 according to an embodiment. The natural language query processor 126 includes a processing circuitry 610 coupled to a memory 620, a storage 630, and a network interface 640. In an embodiment, the components of the natural language query processor 126 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the natural language query processor 126 with communication with, for example, the security database 128.

It should be understood that the embodiments described herein are not limited to the specific architecture illustrated in FIG. 6, and other architectures may be equally used without departing from the scope of the disclosed embodiments.

Furthermore, in certain embodiments the inspector 122, the inspection controller 124, the security database 128, and the like may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a database query based on a natural language query, comprising:
   receiving an unstructured natural language query directed to a security database, wherein the security database includes a representation of a computing environment;
   selecting a group of database queries from a plurality of preexisting database queries based on a similarity to the unstructured natural language query;
   generating a context for processing by a language model, the context including the selected group of database queries, an identified technology, and a schema of the computing environment;
   processing a prompt and the generated context utilizing the language model to generate a second database query; and
   executing the second database query on the security database.

2. The method of claim 1, wherein selecting the group of database queries further comprises:
   vectorizing each of: the preexisting database queries and the unstructured natural language query;
   determining a similarity score between vector of a preexisting database query and a vector of the unstructured natural language query; and
   selecting preexisting database queries based on a similarity score exceeding a predetermined threshold.

3. The method of claim 2, further comprising:
   re-ranking the selected preexisting database queries; and
   generating the context based on the re-ranked preexisting database queries.

4. The method of claim 1, further comprising:
   generating the prompt for a large language model based on the unstructured natural language query and a first database query.

5. The method of claim 4, further comprising:
   determining a data schema, the data schema utilized to represent an entity of the computing environment; and
   generating the prompt further based on the determined data schema.

6. The method of claim 5, further comprising:
   determining the data schema based on the unstructured natural language query.

7. The method of claim 4, further comprising:
   generating the prompt further based on a technology identifier, the technology identifier determined based on data extracted from the unstructured natural language query.

8. The method of claim 1, further comprising:
   parsing the received natural language query to a textual input including a plurality of text elements; and
   matching a text element of the plurality of text elements to a data schema.

9. A non-transitory computer-readable medium storing a set of instructions for generating a database query based on a natural language query, the set of instructions comprising:
   one or more instructions that, when executed by one or more processors of a device, cause the device to:
     receive an unstructured natural language query directed to a security database, wherein the security database includes a representation of a computing environment;
     select a group of database queries from a plurality of preexisting database queries based on a similarity to the unstructured natural language query;
     generate a context for processing by a language model, the context including the selected group of database queries, an identified technology, and a schema of the computing environment;
     process a prompt and the generated context utilizing the language model to generate a second database query; and
     execute the second database query on the security database.

10. A system for generating a database query based on a natural language query comprising:
    a processing circuitry;
    a memory, the memory containing instructions that, when executed by the processing circuitry, configure the system to:
    receive an unstructured natural language query directed to a security database, wherein the security database includes a representation of a computing environment;
    select a group of database queries from a plurality of preexisting database queries based on a similarity to the unstructured natural language query;
    generate a context for processing by a language model, the context including the selected group of database queries, an identified technology, and a schema of the computing environment;
    process a prompt and the generated context utilizing the language model to generate a second database query; and
    execute the second database query on the security database.

11. The system of claim 10, wherein the memory contains further instructions that, when executed by the processing circuitry for selecting the group of database queries, further configure the system to:
 vectorize each of: the preexisting database queries and the unstructured natural language query;
 determine a similarity score between vector of a preexisting database query and a vector of the unstructured natural language query; and
 select preexisting database queries based on a similarity score exceeding a predetermined threshold.

12. The system of claim 11, wherein the memory contains further instructions which when executed by the processing circuitry further configure the system to:
 re-rank the selected preexisting database queries; and
 generate the context based on the re-ranked preexisting database queries.

13. The system of claim 10, wherein the memory contains further instructions which when executed by the processing circuitry further configure the system to:
 generate the prompt for a large language model based on the unstructured natural language query and a first database query.

14. The system of claim 13, wherein the memory contains further instructions which when executed by the processing circuitry further configure the system to:
 determine a data schema, the data schema utilized to represent an entity of the computing environment; and
 generate the prompt further based on the determined data schema.

15. The system of claim 14, wherein the memory contains further instructions which when executed by the processing circuitry further configure the system to:
 determine the data schema based on the unstructured natural language query.

16. The system of claim 13, wherein the memory contains further instructions which when executed by the processing circuitry further configure the system to:
 generate the prompt further based on a technology identifier, the technology identifier determined based on data extracted from the unstructured natural language query.

17. The system of claim 10, wherein the memory contains further instructions which when executed by the processing circuitry further configure the system to:
 parse the received natural language query to a textual input including a plurality of text elements; and
 match a text element of the plurality of text elements to a data schema.

* * * * *